United States Patent [19]

Bihlmaier

[11] 4,119,353
[45] Oct. 10, 1978

[54] LOAD-DEPENDENT FOUR-CIRCUIT BRAKE SYSTEM ESPECIALLY FOR COMMERCIAL VEHICLES

[75] Inventor: Eugen Bihlmaier, Winnenden, Fed. Rep. of Germany

[73] Assignee: Daimler-Benz Aktiengesellschaft, Fed. Rep. of Germany

[21] Appl. No.: 796,534

[22] Filed: May 13, 1977

[30] Foreign Application Priority Data

May 20, 1976 [DE] Fed. Rep. of Germany ....... 2622534

[51] Int. Cl.$^2$ .............................................. B60T 8/20
[52] U.S. Cl. .................................. 303/22 R; 188/195
[58] Field of Search ........... 188/195; 303/22 A, 22 R, 303/23 A, 23 R

[56] References Cited

U.S. PATENT DOCUMENTS 3,002,791  10/1961  Pease .............................. 303/22 A X

FOREIGN PATENT DOCUMENTS 645,242  9/1962  Italy ....................................... 303/22 R
1,161,825  8/1969  United Kingdom .................. 303/22 A Primary Examiner—George E. A. Halvosa
Attorney, Agent, or Firm—Craig & Antonelli

[57] ABSTRACT

A load-dependent four-circuit brake system is equipped with a hydropneumatic spring system, in which each spring leg includes a connection to a brake pressure regulating valve. In addition to the pressure applied by the brake pedal to the brake pressure regulating valve, also a part of the pressure prevailing in the spring leg is applied to the brake pressure regulating valve and the spring leg pressure acts, with a predetermined position of a relief valve slide member, on the brake cylinder corresponding to the respective position of the brake pedal.

16 Claims, 1 Drawing Figure

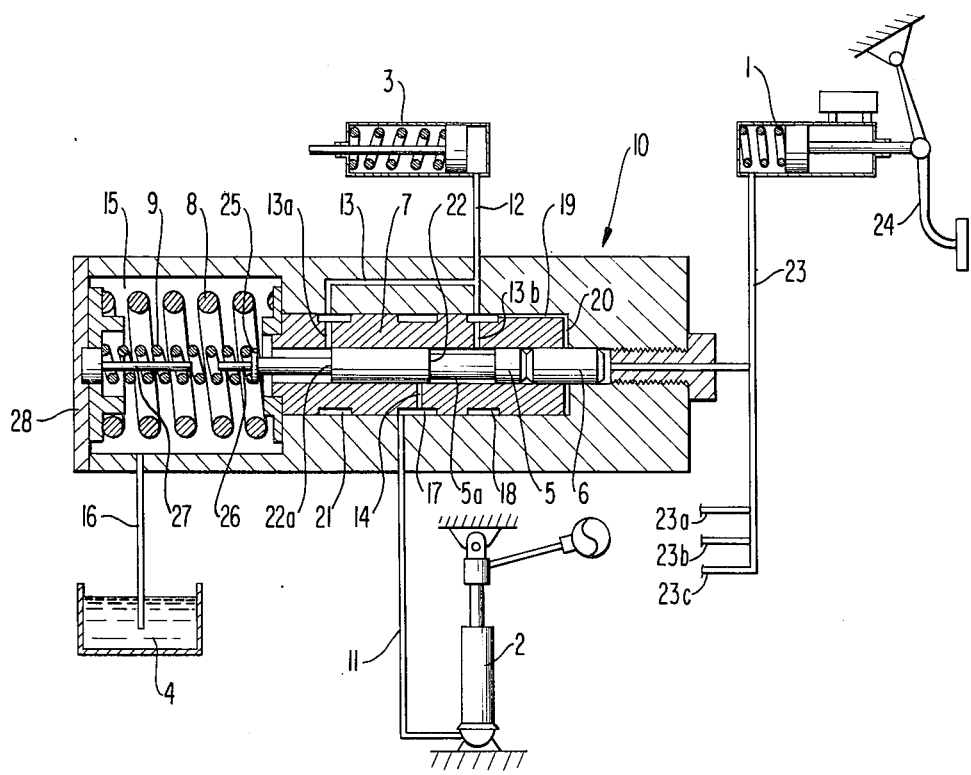

LOAD-DEPENDENT FOUR-CIRCUIT BRAKE SYSTEM ESPECIALLY FOR COMMERCIAL VEHICLES

The present invention relates to a load-dependent four-circuit brake installation, especially of a commercial motor vehicle such as a truck, which is equipped with a hydropneumatic spring system.

If a central hydraulic system is present in a motor vehicle, especially in a commercial motor vehicle, in which the hydropneumatic spring system, the servo-steering system and the brakes are actuated by means of an oil circulatory system, which stems from a pump, then it is possible to provide load-dependent brakes.

In a commercial vehicle such as a truck or bus with a four-point level control, a static distribution of the spring load onto the spring legs results after the adjustment of the level. The level will also adjust itself with a one-sided distribution of the load.

Each axle side then adjusts in its spring leg a predetermined hydraulic pressure, which corresponds to the spring load of this axle side.

This adjustment, however, may considerably change on each wheel side during the driving operation. Thus, when driving through curves, the outer axle sides are loaded more strongly whereas the springs are correspondingly strongly relieved at the inner side of the curve. During full-braking, the spring forces at the front axle may increase to almost double the value so that a corresponding stronger braking would have to take place if one is to avoid that the relieved rear wheels block prematurely.

The most extreme case is a full-braking operation in a loaded tractor. In such a vehicle, still larger mass forces rest on the front axle than with a bus or with a truck. If such a tractor-trailer unit has to negotiate additionally a curve during a full-braking operation, then the spring force on the outside of the curve may increase at the front axle to three times the previous value. The front axle rests initially on the pads or cushions at this place, however, already during the immersion, i.e., within a second, the level control pumps the body to level-height whereby the hydraulic pressure in the corresponding spring leg rises to about three times the amount. If in such a case this vehicle now also drives additionally into a road groove, i.e., into a track cut into the road by vehicle wheels and therefore lying below the level of the remaining road, then a further adiabatic increase of the hydraulic pressure in the spring leg may occur.

It is the aim of the present invention to take into consideration the differently large loads which may act on the individual wheels under different conditions, during the braking to the extent, in which the forces are increased at the respective wheel.

The underlying problems are solved according to the present invention in that each spring leg of the hydropneumatic spring system includes a connection to a brake pressure regulating valve, i.e., a metering valve, which is operable in such a manner that, in addition to the pressure initiated by the brake pedal on the brake pressure regulating valve, a load-dependent portion of the pressure prevailing in the spring leg is applied to the brake pressure regulating valve and acts on the brake cylinder, with a predetermined position of a relief valve slide member, corresponding to the respective position of the brake pedal. The underlying problems are solved constructively in that, in addition to the pressure produced in the master cylinder to actuate the brake pressure regulating valve, the pressure is fed to brake cylinder out of a spring leg by way of a relief valve bore and by way of grooves in the relief valve slide member, after a control edge of the relief valve slide member, which is displaced against the pressure of a return spring by a transmitting piston acted upon by the pressure in the master cylinder, has reached the relief valve bore. This pressure supply, of course, cannot be increased continuously. For that reason, provision is made that the pressure introduced from the spring leg by way of the relief bore and the grooves at the relief valve slide member is conducted to the end surface of the relief valve sleeve facing the brake pedal by way of further grooves provided at the relief valve sleeve surrounding the relief valve slide member, and in that this pressure displaces the relief valve sleeve against the pressure of a measuring spring away from the brake pedal and as a result thereof, the pressure supply from the spring leg is interrupted as soon as the relief valve slide member control edge is again separated from the relief valve bore provided in the relief valve sleeve, whereby a discharge line is provided which in another position of the relief valve sleeve is able to connect the brake cylinder line with the discharge and measuring spring space by way of a by-pass line and grooves as well as cross bores in the relief valve sleeve and in the relief valve slide member.

The relief valve slide member also has to be brought back again into its starting position in a given case. For that purpose, provision is made that the relief valve slide member includes a collar which projects into the discharge and measuring spring space, at which is supported the return spring.

On the other hand, the relief valve slide member also must not advance too far. For that reason, provision is made that the relief valve slide member is provided with an extension projecting into the discharge and measuring spring space, which is surrounded by the return spring, and which cooperates as limit abutment with a bolt which is seated in the bottom of the discharge and measuring spring space and is also surrounded by the return spring.

In order to avoid that as heretofore water diffuses in due course of time into the brake-oil through hoses, which reduces the length of life of the brake-oil, it is additionally proposed according to the present invention to extend stationary lines made of metal from each spring leg to the corresponding metering valve.

As a result of the construction of a brake installation according to the present invention, the latter is converted into a load-dependent four-circuit brake system. The rear axle with double tires can now operate with approximately twice the brake power whereas heretofore the brake power was divided to the same extent over the two axles. Additionally, the brake will be so designed that during normal moderate braking, the rear axle will be braked more strongly than heretofore, as a result of which an excessive nose-diving of the front axle is prevented. For that purpose, the measuring spring at the rear axle is selected twice as hard or stiff as at the front axle. Additionally, it is advantageous that with an extreme full-braking operation, the front axle receives accurately the necessary load-dependent brake power. The rear axle, in contradistinction thereto, is relieved load-dependent, which prevents a detachment of the tire from the road surface, keeps the rear axle in the rack and prevents a blocking of the rear wheels. This is important, above all, for non-loaded commercial vehicles.

The storage capacity of the pressure reservoir at the spring leg permits in case of an emergency more than thirty braking operations at the one wheel side, even if the central pump which supplies the spring leg fails. This also indicates that the safety of the vehicle is considerably increased by the four-circuit brake system according to the present invention. Also, the use of metal pipes as brake lines which extend fixedly from the spring leg bottom to the metering valve avoids the disadvantage that hoses, which have been used heretofore, permit in the course of time water to diffuse into the brake oil, which reduces the length of life of the brake oil.

Accordingly, it is an object of the present invention to provide a load-dependent four-circuit brake system, especially for commercial vehicles, which avoids by simple means the aforementioned shortcomings and drawbacks encountered in the prior art.

Another object of the present invention resides in a load-dependent four-circuit brake installation, especially for commercial types of motor vehicles, which increases the braking reliability and therewith the safety of the vehicle to a considerable extent.

A further object of the present invention resides in a four-circuit brake system for motor vehicles, especially for trucks, which prevents a disengagement of the tires from the road surface and a possible blocking of the rear wheels.

Still another object of the present invention resides in a four-circuit brake system which considerably increases the length of life of the brake oil.

These and other objects, features and advantages of the present invention will become more apparent from the following description when taken in connection with the accompanying drawing which shows, for purposes of illustration only, one embodiment in accordance with the present invention, and wherein:

The single FIGURE is a somewhat schematic view of a four-circuit brake installation in accordance with the present invention.

Referring now to the single FIGURE of the drawing, the brake pressure regulating or control valve generally designated by reference numeral 10 is illustrated therein essentially as metering valve which is actuated by the master cylinder 1. The spring leg 2 supplies the hydraulic pressure which corresponds to the load on the corresponding wheel. This pressure is fed to a relief valve slide member 5 by way of a line 11, an annular space 17 and a bore 14.

During braking, brake oil is supplied from the master cylinder 1 by way of a bore 23, and the pressure oil exerts a pressure by way of a transmitting piston 6 on the relief valve slide member 5 which moves against a return spring 9 to the left as viewed in the drawing. If a control edge 22 of the relief valve slide member 5 reaches the height of the bore 14, through which the pressure oil is fed from the spring leg 2 by way of the pressure line 11 and the annular groove 17, then a pressure builds up immediately by way of the longitudinal grooves 5a and the cross bores 13b and by way of a line 12 up to a brake cylinder 3. This pressure also reaches the end face 20 of a relief valve sleeve 7 by way of an annular groove 18 as well as by way of a longitudinal groove 19, and thereby displaces the relief valve sleeve 7 against a measuring spring 8, whereby the latter is being compressed. As a result of the displacement of the relief valve sleeve 7 in the direction toward the measuring spring 8, i.e., toward the left as viewed in the drawing, the bore 14 again leaves the control edge 22, i.e., moves past the same toward the left, so that the pressure supply from the spring leg 2 to the brake cylinder 3 is again interrupted.

During this operation, a discharge line 13 is closed off by the relief valve slide member 5 because the control edge 22a thereof closes the bore 13a.

During a repeated braking operation, the relief valve sleeve 7 moves together with the relief valve slide member 5 in the direction toward the measuring spring 8, i.e., toward the left as viewed in the drawing, and as a result thereof, an equilibrium will establish itself between the measuring spring 8 and the slide member travel.

If the brake pressure is reduced by retraction or release of the brake pedal 24, then also the relief valve slide member 5 is pushed back toward the brake pedal 24 by the return spring 9, i.e., toward the right as viewed in the drawing. When the bore 13a is released or opened up by the edge 22a, the pressure in this line 13a and therewith in the brake cylinder 3 collapses and the excess oil is conducted back into the oil sump 4 out of the discharge and spring space 15 by way of the line 16. The pressure in the brake cylinder 3 and on the end face 20 of the relief valve sleeve 7 also decreases correspondingly. Consequently, with a decrease of the brake pressure, the relief valve sleeve 7 remains stuck at the relief valve slide member 5 and again an equilibrium will establish itself between measuring spring 8 and the slide member travel.

Connecting lines 23a, 23b and 23c are provided on the line 23, to which are connected further metering valves, which are placed in communication with the other spring legs by means of lines corresponding to the line 11.

The relief valve slide member 5, as to the rest, includes a collar 25 which projects into the discharge and measuring spring space 15, and on which is supported the return spring 9. This collar 25 of the relief valve slide member 5 is seated on an extension 26 which projects into the discharge and measuring spring space 15, which is surrounded by the return spring 9 and which cooperates as limit abutment with a bolt 27 that is seated in the bottom 28 of the discharge and measuring spring space 15 and is also surrounded by the return spring 9.

While I have shown and described only one embodiment in accordance with the present invention, it is understood that the same is not limited thereto but is susceptible of numerous changes and modifications as known to those skilled in the art, and I therefore do not wish to be limited to the details shown and described herein but intend to cover all such changes and modifications as are encompassed by the scope of the appended claims.

I claim:

1. A load-dependent four-circuit brake installation, which comprises hydropneumatic spring means including spring leg means, brake cylinder means, and a brake pedal-operated fluid source for actuating the brake installation, characterized in that the brake cylinder means is exclusively operative by pressure from the spring leg means, each spring leg means of the hydropneumatic spring system includes a fluid connection to a brake pressure regulating valve means, said brake pressure regulating valve means including a relief valve slide member with groove means therein for connecting the fluid in said spring leg means with the brake cylinder means and further including line means for connecting the fluid from the brake pedal-operated fluid source with the relief valve slide member, said relief valve slide member being operable in a predetermined position of the relief valve slide member to allow application of a portion of the fluid pressure prevailing in the spring leg means through said groove means to said brake cylinder means corresponding to the fluid pressure acting on said relief valve slide member in response to brake pedal operation.

2. A four-circuit brake installation with a master cylinder means according to claim 1, characterized in that the pressure which is supplied out of a spring leg means to the brake cylinder means by way of a relief valve bore means and by way of said groove means at the relief valve slide member, is supplied to the brake cylinder means after a control edge provided on the relief valve slide member has reached the relief valve bore means.

3. A four-circuit brake installation according to claim 2, characterized in that the relief valve slide member together with its control edge is displaced against the pressure of a return spring by a transmission piston acted upon by the pressure through said line means from said pedal-operated fluid source.

4. A four-circuit brake installation with a brake-cylinder line according to claim 2, characterized in that the pressure supplied from the spring leg means by way of the relief valve bore means and the groove means at the relief valve slide member is conducted to the end surface, facing the brake pedal, of a relief valve sleeve means forming part of the brake pressure regulating valve means and surrounding the relief valve slide member by way of further groove means provided at the relief valve sleeve means, and in that this last-mentioned pressure displaces the relief valve sleeve means away from the brake pedal against the pressure of a measuring spring and the pressure supply from the spring leg means is thereby interrupted, as soon as the relief valve slide member control edge is again separated from the relief valve bore means provided in the relief valve sleeve means, prior to which a discharge line was closed by another control edge of the relief valve slide member, said discharge line being operable in another position of the relief valve sleeve means to connect as by-pass line the brake-cylinder line with a discharge and measuring spring space means.

5. A four-circuit brake installation according to claim 4, characterized in that the discharge line is able to connect as by-pass line the brake cylinder line with the discharge and measuring spring space means by way of groove and cross bore means in at least the relief valve sleeve means.

6. A four-circuit brake installation according to claim 5, characterized in that the relief valve slide member includes a collar that projects into the discharge and measuring spring space means, the return spring being supported at said collar.

7. A four-circuit brake installation according to claim 6, characterized in that the relief valve slide member is provided with an extension projecting into the discharge and measuring spring space means, which is surrounded by the return spring and which cooperates as limit abutment with a bolt that is seated in the bottom of the discharge and measuring spring space means and is also surrounded by the return spring.

8. A four-circuit brake installation according to claim 7, characterized in that fixed lines made of metal are provided from each spring leg means to a corresponding brake pressure regulating valve means, the brake pressure regulating valve means acting as a metering valve.

9. A four-circuit brake installation with a brake-cylinder line according to claim 1, characterized in that the pressure supplied from the spring leg means is conducted to the end surface, facing the brake pedal, of a relief valve sleeve means forming part of the brake pressure regulating valve means and surrounding the relief valve slide member, and in that this last-mentioned pressure displaces the relief valve sleeve means away from the brake pedal against the pressure of a measuring spring and the pressure supply from the spring leg means is thereby interrupted, as soon as a relief valve slide member control edge is again separated from relief valve bore means provided in the relief valve sleeve means, prior to which a discharge line was closed by another control edge of the relief valve slide member, said discharge line being operable in another position of the relief valve sleeve means to connect as by-pass line the brake-cylinder line with a discharge and measuring spring space means.

10. A four-circuit brake installation according to claim 9, characterized in that the discharge line is able to connect as by-pass line the brake cylinder line with the discharge and measuring spring space means by way of groove and cross bore means in at least the relief valve sleeve means.

11. A four-circuit brake installation according to claim 1, characterized in that the relief valve slide member includes a collar that projects into a discharge and measuring spring space means, a return spring being supported at said collar.

12. A four-circuit brake installation according to claim 11, characterized in that the relief valve slide member is provided with an extension projecting into the discharge and measuring spring space means, which is surrounded by the return spring and which cooperates as limit abutment with a bolt that is seated in the bottom of the discharge and measuring spring space means and is also surrounded by the return spring.

13. A four-circuit brake installation according to claim 12, characterized in that fixed lines made of metal are provided from each spring leg means to a corresponding brake pressure regulating valve means, the brake pressure regulating valve means acting as a metering valve.

14. A four-circuit brake installation according to claim 1, characterized in that fixed lines made of metal are provided from each spring leg means to a corresponding brake pressure regulating valve means, the brake pressure regulating valve means acting as a metering valve.

15. A load-dependent four-circuit brake installation according to claim 1, wherein a plurality of brake pressure regulating valve means are provided, each brake pressure regulating valve means being coordinated with a respective spring leg means and a brake cylinder means and receiving pressure initiated by the brake pedal.

16. A load-dependent four-circuit brake installation according to claim 1, wherein the spring leg means has a pressure reservoir with a storage capacity that permits, in case of an emergency, more than 30 braking operations at a single wheel side.

* * * * *